Mar. 13, 1923.

J. METTENBURG

TRACTOR ATTACHMENT

Filed Sept. 29, 1922

1,448,634.

J. Mettenburg,
Inventor

By C. A. Snow & Co.
Attorney

Patented Mar. 13, 1923.

1,448,634

UNITED STATES PATENT OFFICE.

JOE METTENBURG, OF MOUNT HAMILL, IOWA.

TRACTOR ATTACHMENT.

Application filed September 29, 1922. Serial No. 591,335.

*To all whom it may concern:*

Be it known that I, JOE METTENBURG, a citizen of the United States, residing at Mount Hamill, in the county of Lee and State of Iowa, have invented a new and useful Tractor Attachment, of which the following is a specification.

This invention aims to provide a simple means whereby the steering wheel of a vehicle, for instance, a tractor, may be locked at the will of an operator in any desired position, thereby to take off the operator, some of the strain incident to steering the vehicle.

It is within the province of the disclosure to improve generally and to enhance the utility of devices of that type to which the invention appertains.

With the above and other objects in view, which will appear as the description proceeds the invention resides in the combination and arrangement of parts and in the details of construction hereinafter described and claimed, it being understood that, within the scope of what is claimed changes in the precise embodiment of the invention shown can be made without departing from the spirit of the invention.

In the accompanying drawings:—

Figure 1:
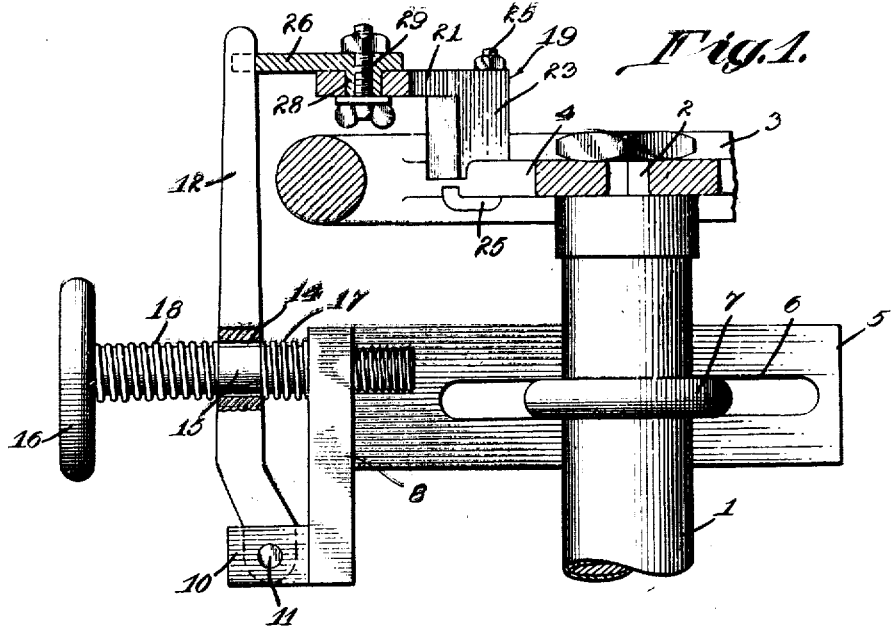
Figure 2:
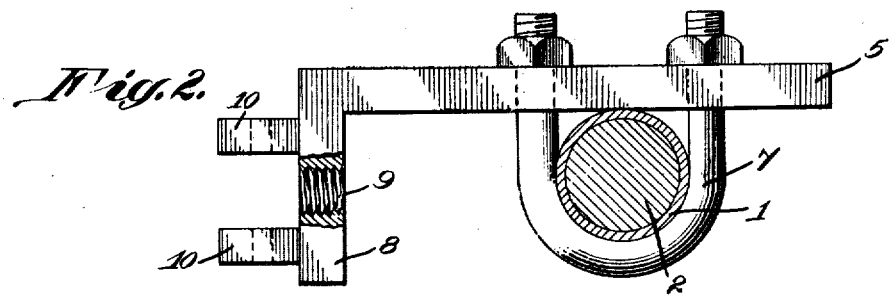
Figure 3:
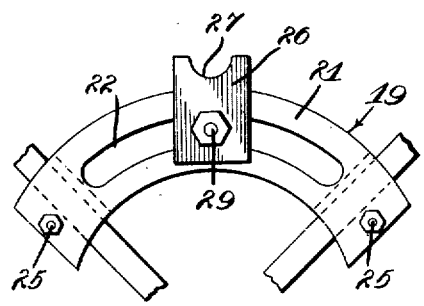

Figure 1 shows in elevation, a device constructed in accordance with the invention, parts being in section; Figure 2 is a plan of the bracket, parts appearing in section; Figure 3 is a plan of the keeper.

The numeral 1 marks the steering column of a vehicle, wherein is journaled a shaft 2 carrying a wheel 3, the spokes of the wheel being marked by the numeral 4.

The numeral 5 marks a bracket disposed transversely of the steering column 1 and provided with an elongated slot 6 through which passes a fastening device 7, which may be in the form of a U-bolt, the slot 6 permitting the bracket 5 to be adjusted with respect to the steering column 1, the fastening device or U-bolt passing about the steering column 1. The bracket 5 is supplied at its rear end with a transverse arm 8 which is downwardly extended below the bracket 5, as shown in Figure 1. In the upper portion of the arm 8 there is a threaded opening 9, the arm being supplied at its lower end with rearwardly extended ears 10 carrying a pivot element 11, whereon a latch lever 12 is mounted for vertical swinging movement, the lever 12 being supplied intermediate its ends with an opening. An adjusting device such as a screw 15, is threaded at its inner end into the opening 9 of the arm 8, the screw being supplied at its rear end with a turning head 16. A compression spring 17 surrounds a portion of the screw 15, one end of the spring 17 abutting against the arm 8 of the bracket 5, and the other end of the spring abutting against the latch lever 12. A compression spring 18 surrounds a portion of the screw 15, the forward end of the spring 18 abutting against the latch lever 12 and the rear end of the spring 18 abutting against the turning head 16 of the screw 15. The screw 15 passes slidably through the opening 14 in the latch lever 12.

A keeper 19 is secured to the steering wheel 3 and cooperates with the latch lever 12. The keeper 19 comprises an arcuate body 21 having a curved guide slot 22. At its ends, the body 21 of the keeper 19 is supplied with depending lugs 23, equipped at their lower ends with seats 24, adapted to receive certain of the spokes 4 of the steering wheel 3. Fastening devices 25, which may be hook bolts pass downwardly through the lugs 23 and engage certain of the spokes 4 of the steering wheel 3, the fastening devices cooperating with the seats 24 to hold the keeper 19 on the steering wheel 3. A rider 26 is mounted for adjustment on the body 21 of the keeper 19 longitudinal or circumferentially thereof, and is supplied in its rear edge with a seat 27 wherewith the latch lever 12 is adapted to coact under the impulse of the spring 18. The rider 26 has a depending projection 28 received slidably in the guide slot 22 of the body 21 of the keeper 19. In order to hold the rider 26 in adjusted positions on the body 21 of the keeper 19, a fastening device 29, which may be a bolt, passes downwardly through the rider 26 and its projection 28, the fastening device serving to bind the rider in adjusted positions on the body 26 of the keeper. It will be obvious that when the latch lever 12 is engaged with the seat 27 of the rider 26, the steering wheel 3 cannot be turned, a large amount of strain being taken off the operator. The rider 26 may be adjusted circumferentially of the body 21 of the keeper 19 and, thus, the position in which the wheel 3 is held by the latch lever 12, may be adjusted. The spring 18 holds the lever 12 engaged with the seat 27 of the rider 26 under all ordinary working conditions but if a dangerous strain should be thrown upon the steering mechanism, the spring 18 will yield and will permit the latch lever 12 to ride out of the seat 27 in the part 26, thereby preventing a breaking of any of the parts shown in the drawings. When the operator desires to release the latch lever 12 from the seat 27 in the rider 26, the screw 15 may be rotated, to decrease the compressive effort of the spring 18, the spring 17 expanding to swing the latch lever out of engagement with the rider.

What is claimed is:—

1. In a device of the class described, comprising a bracket; a latch mounted to swing on the bracket; a keeper; a rider mounted for adjustment on the keeper, the latch coacting with the rider; and means for holding the rider in adjusted positions on the keeper.

2. A device of the class described comprising a bracket; a latch mounted to swing on the bracket; an adjusting device movable longitudinally in the bracket; a compression spring interposed between the bracket and the latch; a compression spring abutting against the adjusting member and against the latch; and keeper mechanism wherewith the latch coacts under the impulse of one of the said springs.

3. A device of the class described comprising a bracket; a keeper; a latch pivoted to the bracket and coacting with the keeper; an adjusting device carried by the bracket and spring cooperating with the latch, one of said springs being compressed, when the adjusting member is advanced, to hold the latch engaged with the keeper, and the other of said springs reacting to disengage the latch from the keeper when the adjusting device is retracted.

4. A device of the class described comprising a keeper including an arcuate body; a rider adjustable on the body circumferentially thereof; means for holding the rider in adjusted positions on the keeper; a bracket; a latch pivoted to the bracket and coacting with the rider; spring means for holding the latch engaged with the rider; spring means for moving the latch out of engagement with the rider; and an adjusting device carried by the bracket and coacting with both of said spring means to relieve the first specified spring means, and to render the second spring means active whereby the second spring means will disengage the latch from the rider.

In testimony that I claim the foregoing as my own, I have hereto affixed my signature in the presence of two witnesses.

JOE METTENBURG.

Witnesses:
J. A. STUCKERJUERGEN,
EDW. STUCKERJUERGEN.